3,719,620
NONLINEAR POLYESTER RESIN COMPOSITIONS
Ralph Earl Layman, Stamford, Conn., assignor to American Cyanamid Company, Stamford, Conn.
No Drawing. Filed Oct. 20, 1971, Ser. No. 191,087
Int. Cl. C09d 3/52, 3/68
U.S. Cl. 260—22 D
10 Claims

ABSTRACT OF THE DISCLOSURE

Nonlinear polyester resin having enhanced flexibility characteristics comprising the esterification reaction product of (1) a mixture of an $\alpha,\beta$ ethylenically unsaturated dicarboxylic acid and a phthalic acid, (2) a mixture of a simple polyhydric alcohol and a complex-ether polyhydric alcohol, and (3) a trimer acid composition of an ethylenically unsaturated aliphatic monocarboxylic acid having between 14 and 22 carbon atoms and a method for preparing the same are provided.

BACKGROUND OF THE INVENTION

Saturated or unsaturated polyester resin compositions have been known for years. These polyester resins are generally prepared by reacting either a phthalic acid or an $\alpha,\beta$ ethylenically unsaturated dicarboxylic acid and a polyhydric alcohol, preferably a glycol, with or without a dicarboxylic acid free of nonbenzenoid unsaturation. These polyester resins, if unsaturated, are generally admixed with a cross-linking agent which is in the nature of a polymerizable monomer containing a $CH_2=C<$ group and having a boiling point of at least about 60° C. The polyester resins can be used for laminating purposes, molding purposes, or coatings. Ordinarily, when used as the coating, the polymerizable monomer functions as the solvent for the system and lends fluidity to the composition. It has been found that by modifying these saturated or unsaturated polyester resins with a mixture of simple and complex polyhydric alcohols as well as with predominant amounts of a trimer composition of an ethylenically unsaturated aliphatic monocarboxylic acid having between about 14 and 22 carbon atoms that improved flexibility, toughness, and elasticity are achieved. Good emulsion characteristics are also developed when the polyester resin is extended with water to form a water-in-oil emulsion.

FIELD OF THE INVENTION

The present invention is in the field of nonlinear polyester resins prepared by reacting a mixture of a phthalic acid and an unsaturated dicarboxylic acid, such as maleic acid, with a combination of dihydric alcohols, such as ethylene glycol as the simple glycol and diethylene glycol as the complex-ether alcohol, in the presence of a trimer acid composition. If desired, any unsaturated ester may be blended with a polymerizable monomer, such as styrene or diallyl phthalate. The latter monomer can be used as a cross-linking agent.

DESCRIPTION OF THE PRIOR ART

The most representative references relating to these unsaturated polyester resins are the United States Letters Patent Nos. 2,255,313 and 2,443,735—41, inclusive, as well as the United States Letters Patent No. 3,158,584, each of which is incorporated herein by reference.

SUMMARY OF THE INVENTION

A nonlinear polyester resin comprising the esterification reaction product of (1) a mixture of saturated polycarboxylic acid and an $\alpha,\beta$ ethylenically unsaturated dicarboxylic acid, (2) a mixture of simple and complex-ether dihydric alcohols, and (3) a mixture comprising a trimer acid composition of an ethylenically unsaturated aliphatic monocarboxylic acid having between 14 and 22 carbon atoms, wherein the total amount of acids present ranges from about 56% to about 72% of which the said trimer acid composition ranges between about 12% and about 20%, and wherein the total alcohols range from about 44% to about 28% of which from about 5% to about 25% of the complex-ether alcohol is present in that mixture, said percentages being by weight, based on the weight of said polyester resin, unless otherwise specified. In the absence of, for instance, a complex-ether dihydric alcohol, such as diethylene glycol, it has been found that a polyester coating having acceptable and enhanced flexibility properties could not be realized.

In the prepartion of the unsaturated polyester resin compositions of the present invention, one can employ an $\alpha,\beta$ unsaturated polycarboxylic acid, such as maleic, fumaric, aconitic, itaconic, monochloromaleic anhydride, and the like. The unsaturated acid should be present in an amount approximating at from about 5.5% to about 15%, by weight, of the total weight of the resin and, preferably, in amounts varying between about 8% and 10%, by weight, based on the total weight of the resin. As a second component of the resin polycarboxylic acid mixture, saturated polycarboxylic acids, that is, those which are free of nonbenzenoid unsaturation, should be utilized in amounts ranging from about 38.5% to about 52%, by weight, based on the total weight of the resin. The latter are illustratively phthalic, malonic, succinic, glutaric, adipic, and chlorinated polycarboxylic acids, such as tetrachlorophthalic anhydride and hexachloroendomethylene tetrahydrophthalic acid. Whenever available, the anhydrides of these acids may be used or mixtures of the acids or mixtures of the anhydrides thereof.

As the simple polyhydric alcohol which may be used to prepare the nonlinear polyesters of the present invention, it is preferred to make use of an alcohol having only two hydroxy groups connected through an alkylene bridge, although minor amounts of alcohols having three hydroxy groups, four hydroxy groups, or more hydroxy groups may be used. As simple dihydroxy alcohols having an alkylene bridge may be mentioned ethylene glycol, propylene glycol, butanediol-1,4, butanediol-1,3, butanediol-1,2, pentanediol-1,2, pentanediol-1,3, pentanediol-1,4, pentanediol-1,5, hexanediol-1,6, and the like. Complex-ether dihydroxy alcohols may be exemplified by diethylene glycol, dipropylene glycol, dibutylene glycol, dihexylene glycol, and the like. The total amount of said dihydroxy compound usually ranging from about 28% to about 44%, based on the weight of resultant resin, is determined from the stoichiometric amount of total carboxylic acids used to prepare the resin coupled with an excess which usually amounts to from about 5% to about 25% and, preferably, from about 10% to about 20%. Of this amount, the complex-ether dihydroxy compound, such as diethylene glycol, present in the admixture amounts to from 5% to 25% and, preferably, from 10% to 15%, based on the weight of the combined simple and complex-ether polyols employed.

The third essential component in the practice of the present invention is the use of a trimer acid composition comprising unsaturated aliphatic monocarboxylic acids having between 14 and 22 carbon atoms. The acid compositions are known in the art and are commercially available. It will be apparent that the contemplated trimer acid compositions are mixtures principally of tricarboxylic acids and tetracarboxylic acids. These acids are derived by conventional procedures involving the polymerizing, such as by the trimerizing, of aliphatic monocarboxylic acids as, for instance, myristoleic, palmitoleic, oleic, tall oil fatty acids, linoleic, linolenic, elaeosteric, licanic, arachidonic, erucic, and the like. Obviously, tetramers are also formed. Such trimers and tetramers may be used either singly or in combination with one another. The amount of the trimer acid composition used in the composition of the present invention may be varied between about 12% and about 20%, by weight, based on the total weight of the polyester resin. It is preferred to use between about 15% and 17%, by weight, same basis. For ease of handling (i.e., to attain low viscosity) it is preferred to utilize a trimer composition of the class described hereinbelow which contains certain "impurities" in the nature of small percentages of the monomer of these same acids or the dimers of these same acids. The monomer acid content of the said composition preferably should not be more than about 15%, by weight, based on the total weight of the trimer acid composition. The dimer acid content present in the trimer acid composition is also found to be small, such as in the order of magnitude of about 8% to 12%, by weight, based on the total weight of the trimer acid composition. The trimer acid per se in the trimer acid composition is present in preponderant amounts, such as between 40% and 70%, by weght, and the tetramer acids present range from 30% to 13%, based on the total weight of the trimer acid composition.

In making the polymer resins of the present invention, one may carry out the esterification reaction until the acid number of the polyester resin falls below about 75 and, usually, below about 40. For optimum results for certain end uses, an acid number below about 10 should be selected. It is generally undesirable to carry the reaction to the point where the acid number drops significantly below about 5.

For many end uses, the polyester resins of the present invention may be prepared by introducing the essential reactants into a suitable reaction vessel and carrying out the esterification reaction. Advantageously, all of the reactants can be introduced ordinarily at the very beginning before the esterification reaction is begun. In this connection, one will ordinarily use a slight excess of the dihydric alcohol components, such as about 5% to 20%, by weight, of excess glycol over and beyond that amount stoichiometrically calculated to esterify (a) all of the carboxyl groups in the $\alpha,\beta$ ethylenically unsaturated dicarboxylic acid, (b) all of the saturated polycarboxylic acid, and (c) all of the carboxyl groups in the trimer acid composition.

In order that the present invention may be more completely understood, the following examples are set forth in which all parts are parts by weight. These examples are set forth primarily for the purpose of illustration, not by way of limitation except as indicated in the appended claims.

Example 1

Into a suitable reaction vessel equipped with thermometer, stirrer, partial condenser, and an inert gas inlet tube, there are introduced 475 parts of propylene glycol, 100 parts of diethylene glycol, 788 parts of isophthalic acid, 108 parts of maleic anhydride, and 300 parts of a tall oil trimer acid composition. This acid composition, by gel phase chromatography, analyzes as containing 45.7% trimer, 28.2% tetramer, 11.4% dimer, and 13.3% monomer whose acid value is 180, neutralization equivalent is 311, and viscosity is 27 poises. These ingredients were charged simultaneously into the reaction vessel and the mixture was heated to 235° C. while being covered by a blanket of carbon dioxide gas being passed through the reacting mass to facilitate the removal of the water esterification. The reaction is continued for 9¼ hours down to an acid number of 9 and a viscosity of 25 to 35 poises at 25° C. as determined on a sample when cut to 60% in an aromatic hydrocarbon solvent whose boiling point is between 375° and 410° F.

The polyester thus produced was cooled to room temperature and then mixed with sufficient hexakis methoxymethyl melamine as a cross-linking agent to yield a 90:10 ratio on a nonvolatile basis. To the latter mixture is next added 0.75% toluenesulfonic acid catalyst, based on the melamine compound. This solution is next pigmented with titanium dioxide and thinned down to approximately 100 seconds viscosity. Typical enamel solids range from 60% to 65%.

Two chromate bath-pretreated aluminum panel 4-inch-wide strips of 0.025-inch thickness were coated with the so-produced enamel paint. After baking for one minute at 525° F., the panels were cooled to room temperature and tested. The enamel thickness measured 0.9 to 1.0 mil and the pencil hardness was F–H for the coating composition.

A flexibility test for the above is also carried out as follows. The strips of coated, baked metal in the form of an unsymmetrical U shape are flattened together in a press. Successive folds were made, one on top of the other, so that at the first fold there was no thickness of metal inside the fold; at the second fold, there was one thickness of metal inside the fold, two thickness of metal inside the third fold, and so on. Thesse were designated as T–0, T–1, and T–2, respectively. Each of the baked enamels, as described, made from Example 1 passed the T–0 bend without failure of the enamel by cracking or peeling. The enamels had high gloss with good flow and leveling properties. Such properties are highly desirable for enamels that are applied to metal as it unwinds from a roll and which will be post-formed at a later date.

Substituting dipropylene glycol or dibutylene glycol for diethylene glycol and trimer soya bean fatty acids for trimeric tall oil fatty acids in the preparation of the above polyester, similar flexibility results are obtained.

Example 2

Into a suitable reaction vessel equipped as in Example 1 above, there are introduced 760 parts of propylene glycol, 106 parts of diethylene glycol, and 962 parts of phthalic anhydride. The mixture is heated to about 230° C. with carbon dioxide gas passing through the reaction and is continued to an acid number of about 50. The mass is cooled to a temperate of 170° C. There are then added 245 parts of maleic anhydride and 360 parts of the same type of trimer acid composition used in Example 1. The partial condenser is removed and the mixture is then reheated to 230° C. and reacted further for 7 hours to an acid number of 9 and a viscosity of 25 to 35 poises at 25° C. when cut to 65% concentration in the aromatic solvent used for Example 1.

The polyester solution thus produced is cooled and then mixed with sufficient hexakis methoxymethyl melamine as a cross-linking agent to yield a 90:10 ratio on a nonvolatile basis. To the latter mixture is next added 0.75% p-toluenesulfonic acid catalyst, based on the melamine compound. This solution is next pigmented with titanium dioxide and thinned down to approximately 100 seconds viscosity. Enamel solids range from 60% to 65%.

After testing for flexibility as in Example 1 above, the panels passed a T–2 bend.

Example 3

Example 1 is repeated in all essential details except that the diethylene glycol reactant was omitted. After tesing for flexibility, the panels did not pass a T–2 bend.

Example 4

Example 2 is repeated in all essential details except that in the polyester preparation the diethylene glycol was omitted. Again, as in Example 3, the panels, when tested for flexibility, did not pass a T–2 bend.

It is an advantage of the present invention to utilize specific diols, both simple and complex, to render resultant enamel utilizing nonlinear polyesters in the preparation of coatings having excellent flexibility.

I claim:

1. A nonlinear polyester resin adapted for use as an enamel paint component and having excellent flexibility characteristics as a coating on a substrate when cross-linked comprising the esterification reaction product of:
   (1) a mixture of an $\alpha,\beta$-ethylenically unsaturated dicarboxylic acid and a saturated polycarboxylic acid,
   (2) a mixture of a simple alkylene dihydric alcohol and a complex-ether oxyalkylene dihydric alcohol, and
   (3) a trimer acid composition of ethylenically unsaturated aliphatic monocarboxylic acids having between 14 and 22 carbon atoms, wherein the total amount of said acids present in (1) and (3) ranges between about 56% and 72%, based on the weight of the polyester resin, of which the said trimer acid composition is present between about 12% and 20%, based on the weight of the so-formed polyester resin, and wherein the total alcohol mixture ranges from about 44% to 28% of which from about 5% to 25% of the complex-ether alcohol is present, said total alcohol percentages being by weight, based on the weight of the so-formed polyester resin.

2. The nonlinear polyester resin according to claim 1 in which (1) is a mixture of from about 8% to 10% of an $\alpha,\beta$ ethylenically unsaturated dicarboxylic acid and from 38.5% to 52% of a saturated dicarboxylic acid free of nonbenzenoid unsaturation.

3. The nonlinear polyester resin according to claim 2 in which the $\alpha,\beta$ ethylenically unsaturated dicarboxylic acid is maleic anhydride.

4. The nonlinear polyester resin according to claim 2 in which the $\alpha,\beta$ ethylenically unsaturated dicarboxylic acid is fumaric acid.

5. The nonlinear polyester resin according to claim 2 in which the dicarboxylic acid free of nonbenzenoid unsaturation is iso-phthalic acid.

6. The nonlinear polyester resin according to claim 1 in which the complex-ether oxyalkylene dihydric alcohol is present in an amount ranging from about 10% to 20%, based on the weight of the combined simple and complex-ether dihydric alcohols.

7. The nonlinear polyester according to claim 6 in which the complex-ether dihydric alcohol is diethylene glycol.

8. The nonlinear polyester according to claim 6 in which the complex-ether dihydric alcohol is dipropylene glycol.

9. A cross-linked polyester comprising the esterification product of claim 1 wherein the said esterification product is cross-linked by a melamine cross-linking agent.

10. The cross-linked polyester of claim 9 wherein the melamine cross-linking agent is hexakis(methoxymethyl) melamine.

References Cited

UNITED STATES PATENTS

| | | | |
|---|---|---|---|
| 3,124,549 | 3/1964 | Salgado et al. | 260—22 D |
| 3,158,584 | 11/1964 | Layman | 260—22 D |
| 2,255,313 | 9/1941 | Ellis | 260—22 CB |
| 3,530,082 | 9/1970 | O'Gorman et al. | 260—22 D |

DONALD E. CZAJA, Primary Examiner

R. W. GRIFFIN, Assistant Examiner

U.S. Cl. X.R.

117—132 BF, 161 L, 161 K; 260—21, 22 CQ